(12) United States Patent
Contorbia et al.

(10) Patent No.: US 9,688,169 B2
(45) Date of Patent: Jun. 27, 2017

(54) SPLIT REAR BACKREST FOR A MOTOR VEHICLE

(71) Applicant: FCA ITALY S.p.A., Turin (IT)

(72) Inventors: Alberto Contorbia, Turin (IT); Daniele Tomasi, Turin (IT); Tommaso Luchetti, Turin (IT); Antonella Rigoli, Turin (IT)

(73) Assignee: FCA Italy S.p.A., Turin (IT)

( * ) Notice: Subject to any disclaimer, the term of this patent is extended or adjusted under 35 U.S.C. 154(b) by 118 days.

(21) Appl. No.: 14/795,329

(22) Filed: Jul. 9, 2015

(65) Prior Publication Data

US 2016/0009203 A1 Jan. 14, 2016

(30) Foreign Application Priority Data

Jul. 10, 2014 (IT) .............. TO2014A0554

(51) Int. Cl.
| | |
|---|---|
| *B60N 2/30* | (2006.01) |
| *B60N 2/68* | (2006.01) |
| *B60N 2/36* | (2006.01) |
| *B60N 2/015* | (2006.01) |
| *B60N 2/42* | (2006.01) |

(52) U.S. Cl.
CPC .............. *B60N 2/36* (2013.01); *B60N 2/015* (2013.01); *B60N 2/3013* (2013.01); *B60N 2/4235* (2013.01); *B60N 2/682* (2013.01)

(58) Field of Classification Search
CPC ............ B60N 2/3013; B60N 2002/684; B60N 2205/35; B60N 2/682
See application file for complete search history.

(56) References Cited

U.S. PATENT DOCUMENTS

| 2,066,630 | A | * | 1/1937 | Leader ................. | B60N 2/2236 |
|---|---|---|---|---|---|
| | | | | | 297/370 |
| 3,114,576 | A | * | 12/1963 | Herider .................... | A47C 7/30 |
| | | | | | 297/354.1 |
| 4,971,395 | A | | 11/1990 | Coussemacq et al. | |

(Continued)

FOREIGN PATENT DOCUMENTS

| DE | 9212370 U1 | 11/1992 |
|---|---|---|
| DE | 10114393 A1 | 10/2002 |

(Continued)

OTHER PUBLICATIONS

Italian Patent Application ITTO20140554, Italian Search Report, Jul. 10, 2014 (8 pages).

(Continued)

*Primary Examiner* — Timothy J Brindley
(74) *Attorney, Agent, or Firm* — Eversheds Sutherland (US) LLP

(57) ABSTRACT

A split rear backrest is arranged between two side panels of a motor vehicle and has two backrests, which are provided with respective lower portions arranged side by side along a horizontal axis and are rotatable independently of each other about said horizontal axis; moreover, the backrest has a shaft, whose ends define respective fastening elements for being coupled to the side panels; the shaft has a segment axially protruding from one of the backrests and rotationally engaging a seat axially formed in the other backrest.

9 Claims, 5 Drawing Sheets

(56) References Cited

U.S. PATENT DOCUMENTS

| | | | |
|---|---|---|---|
| 6,666,512 B1* | 12/2003 | Timon | B60N 2/3013 296/65.09 |
| 7,240,949 B1* | 7/2007 | Moushegian et al. | B60N 2/065 296/65.01 |
| 2004/0201265 A1* | 10/2004 | Ichikawa et al. | B60N 2/3013 297/354.13 |
| 2006/0033372 A1* | 2/2006 | Lee | B60N 2/22 297/378.1 |
| 2010/0187878 A1* | 7/2010 | Funk et al. | B60N 2/206 297/232 |
| 2011/0109130 A1* | 5/2011 | Nakaya et al. | B60N 2/3013 297/188.04 |
| 2011/0187168 A1* | 8/2011 | Zorine | B60N 2/3013 297/248 |
| 2013/0093226 A1* | 4/2013 | Mitsuhashi et al. | B60N 2/68 297/232 |
| 2014/0084657 A1* | 3/2014 | Edwards et al. | B60N 2/3013 297/354.1 |
| 2015/0028618 A1* | 1/2015 | Seto et al. | B60N 2/366 296/65.09 |
| 2015/0102650 A1* | 4/2015 | Hosbach et al. | B60N 2/68 297/452.18 |
| 2015/0375645 A1* | 12/2015 | Muller | B60N 2/3013 297/463.1 |

FOREIGN PATENT DOCUMENTS

| | | |
|---|---|---|
| EP | 0336819 A1 | 10/1989 |
| EP | 0673800 A1 | 9/1995 |
| FR | 1586905 A1 | 10/1996 |
| FR | 2732280 A1 | 10/1996 |
| WO | 2010/009321 A1 | 1/2010 |

OTHER PUBLICATIONS

European Application 15176176.4, Extended Search Report Issued Dec. 15, 2015 (9 pages).

* cited by examiner

SPLIT REAR BACKREST FOR A MOTOR VEHICLE

The present invention relates to a split rear backrest for a motor vehicle.

BACKGROUND OF THE INVENTION

Typically, the split rear rests for motor vehicles comprise two units arranged side by side, each having a respective seat portions and a respective backrest. The backrests are hinged to the corresponding seat portions to rotate between a raised position, in normal use, and a lowered position, in which the backrests are lowered forward to increase the space of the trunk arranged behind the rear backrest. Typically, the seat comprises a bracket, which is arranged on the rotation axis of the backrests, in an intermediate position between the two units, and has a lower portion fixed to the floor of the motor vehicle and an upper portion supporting both units.

Such intermediate bracket is designed and produced with a size and a shape depending on the available space in the motor vehicle, on the shape of the floor, on the height position and the longitudinal position of the backrests, etc. Therefore, the features of the intermediate bracket remarkably vary among the various vehicles.

The document FR2732280A1 corresponds to the preamble of Claim 1 and discloses a split seat having two backrests arranged side by side, reclining independently of each other about a horizontal axis defined by a rigid bar. One of the two backrests is integral with said bar and rotates with this latter about the horizontal axis, while the other backrest is hinged and rotatable relative to the bar. However, also in this case, there is a bracket which supports the bar in an intermediate position between the two backrests.

A solution free of the intermediate bracket supporting the two units of the rear seat would be needed in order to simplify the design and the realization of the motor vehicle and, therefore, to make its production as consistent as possible.

SUMMARY OF THE INVENTION

The object of the present invention is therefore to provide a split rear backrest for a motor vehicle which allows to meet the aforesaid need in a simple and economic way. Therefore, the present invention provides a split rear backrest for a motor vehicle as defined in claim 1.

BRIEF DESCRIPTION OF THE DRAWINGS

For a better understanding of the present invention it is now described a preferred embodiment, purely by way of a non-limiting example, with reference to the accompanying drawings, showing as follows.

DETAILED DESCRIPTION OF THE INVENTION

Figure 1:
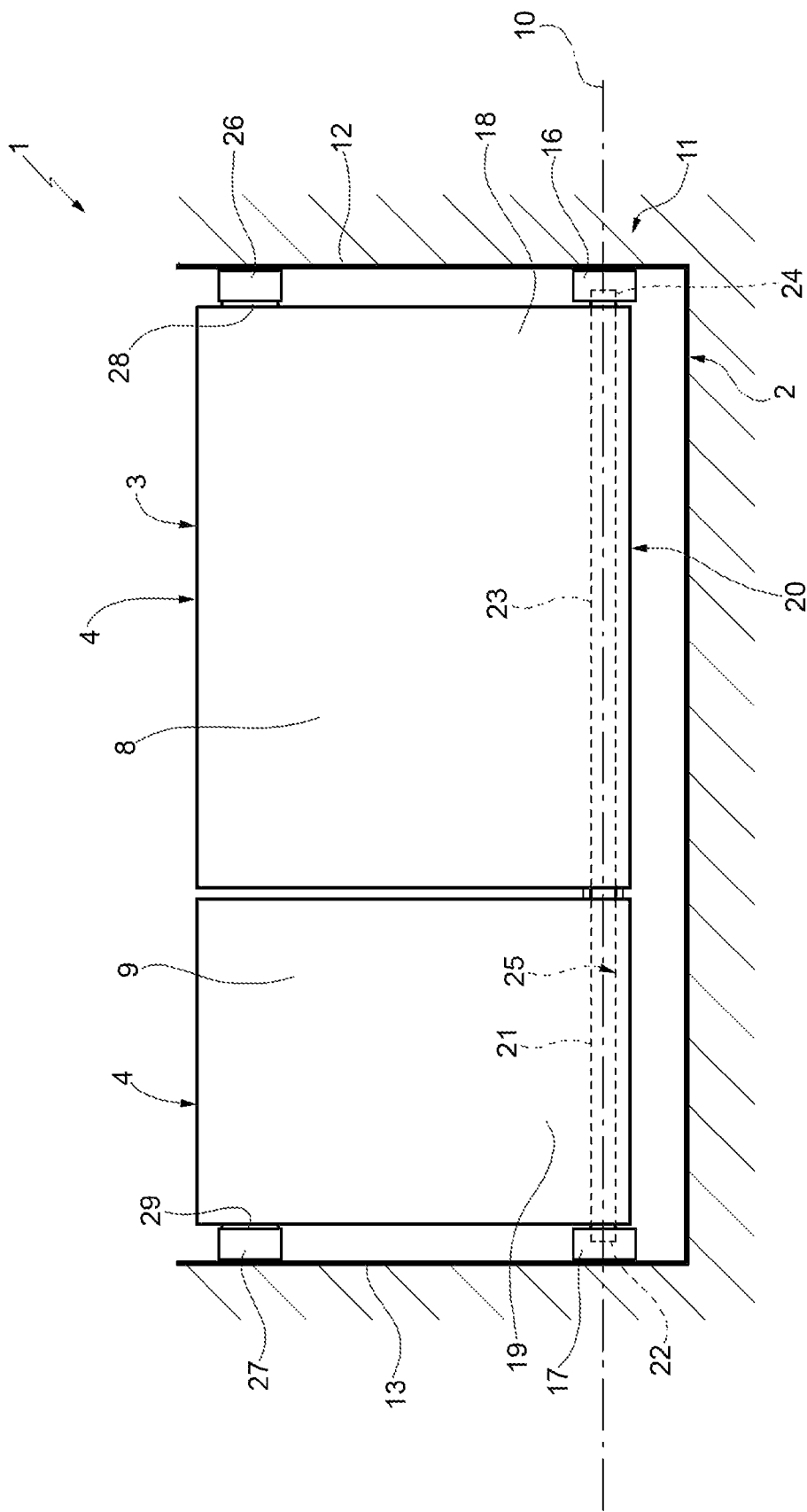
FIG. 1 is a schematic view, frontally and partially showing a preferred embodiment of the rear seat of a motor vehicle according to the present invention.

In FIG. 1, the reference number 1 indicates, as a whole, a motor vehicle (partially and schematically shown) comprising a body 2 and a rear seat 3.

The seat 3 is preferably mounted as the last row of seats in the passenger compartment of the motor vehicle 1, i.e. before a rear trunk (not shown). The seat 3 is split, i.e. it comprises two units 4, which are horizontally arranged side by side and comprise a respective seat portion (not shown) and a respective backrest.

The backrests of the two units 4 are respectively indicated by the reference numbers 8 and 9, comprise respective inner frames 8a, 9a (FIG. 3) and can be independently reclined with respect to the body 2 from a raised position to a lowered position about a horizontal rotation axis 10, which is orthogonal to the longitudinal advancement direction of the motor vehicle 1 and is arranged in a fixed position in the motor vehicle 1.

In the raised position, the backrests 8, 9 support the back of one or more users. In the lowered position (not shown), the backrests 8,9 are folded forward over the corresponding seat portions, in a substantially horizontal position, in order to unite the trunk with the passenger compartment of vehicle 1 and thus increase the space of the trunk. In particular, the backrest 8 occupies a percentage equal to about 60% of the entire width of the seat 3, while the backrest 9 roughly occupies the remaining 40%.

The motor vehicle 1 comprises a supporting and coupling assembly 11, coupling the inner frames 8a, 9a of the backrests 8, 9 to two sides or side panels 12, 13 of the body 2 by means of only four fastening points.

The assembly 11 comprises two support members 16, 17 respectively fixed to the sides 12, 13 and arranged along the axis 10, beside a lower end portion 18 of the backrest 8 and, respectively, beside a lower end portion 19 of the backrest 9.

The assembly 11 also comprises a shaft 20, which is preferably defined by a tube, is continuous from one side to the other, is coaxial with the members 16, 17 along the axis 10, is supported by the members 16, 17 and is configured to allow the backrests 8 and 9 to independently rotate about the axis 10.

Figure 3:
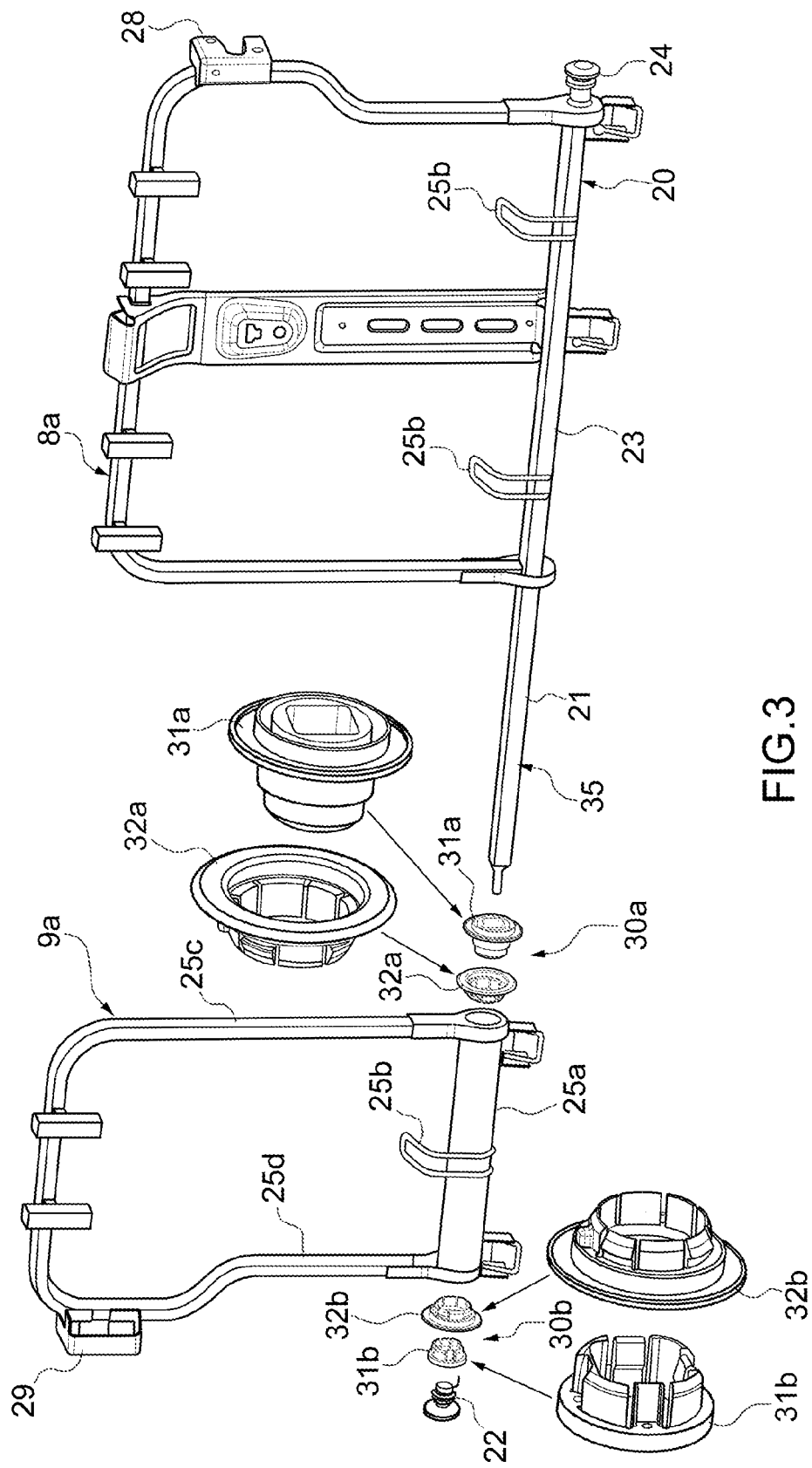
FIG. 3 is a perspective view of the rear seat of FIG. 1, with parts removed for clarity and with components shown in exploded view.
Figure 4:
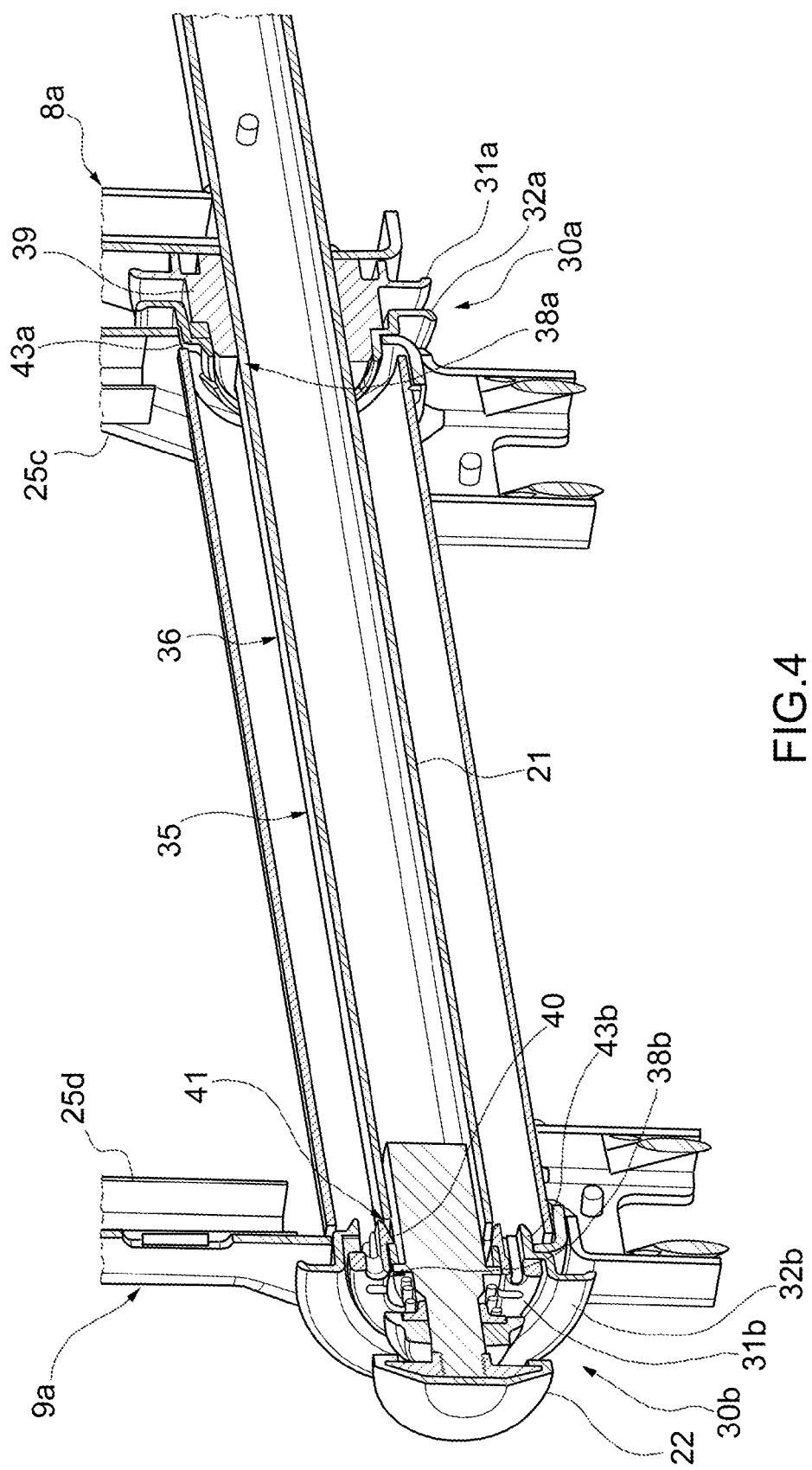
FIG. 4 shows in section and on an enlarged scale a detail of the rear seat of FIG. 3.

The shaft 20 includes a segment 21, axially projecting from the portion 18 towards the wall 13 (i.e. in the opposite direction to the wall 12), and engages a seat 25 formed in the portion 19 along the axis 10. At the same time, the portion 19 is hinged to the segment 21. As shown in FIGS. 3 and 4, the seat 25 is defined by a tube 25a which constitutes part of the frame 9a and supports a fastening element 25b, configured to define a so-called "Isofix" fastening for connecting a child seat. With regard to the seat 8, other fastening elements 25b are directly fixed to the segment 23.

Figure 5:
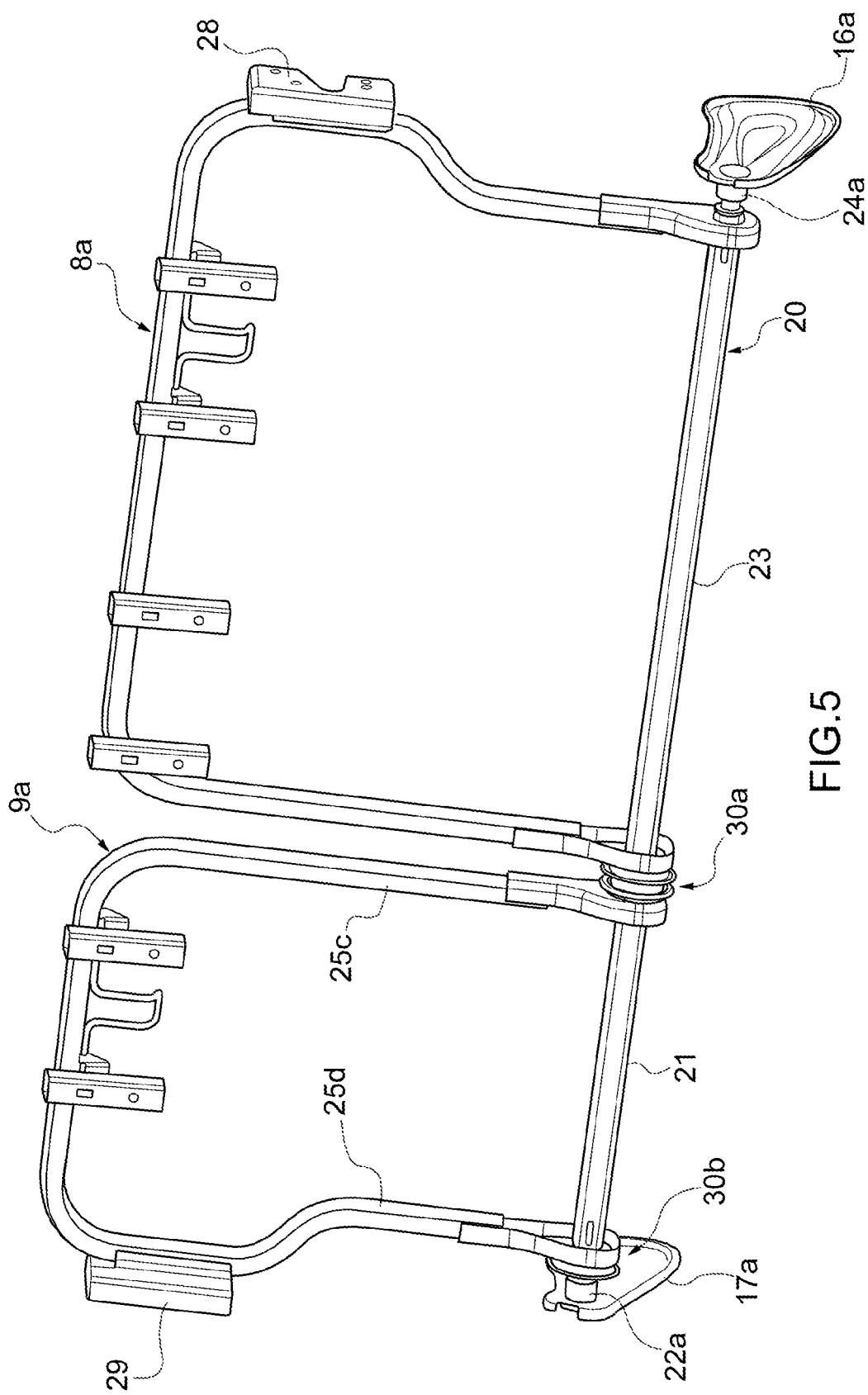
FIG. 5 shows an embodiment of the rear seat of FIG. 3.

The axial ends of the tube 25a are fixed, in particular by welding, to two lateral uprights 25c, 25d of the frame 9a. In the embodiment of FIG. 5, however, the frame 9a lacks the tube 25a and the seats 8, 9 are free from fastening elements 25b.

As shown in FIG. 1, after the segment 21, the shaft 20 terminates with a fastening element 22, axially protruding with respect to the portion 19 and coupled to the member 17.

At the opposite axial end, the shaft 20 terminates with a fastening element 24, axially protruding with respect to the portion 18 and coupled to the member 16.

The shaft 20 further comprises a segment 23, which is arranged within the portion 18 as a prolongation of the segment 21 and of the fastening element 24, and preferably forms a single piece with the segment 21.

The segment 23 is fixed with respect to the inner frame 8a (FIG. 3). At the same time, the fastening elements 22 and 24 are coupled to the members 17 and 16 by rotating about the axis 10.

According to a not illustrated embodiment, the segments 21, 23 are defined by separate, mutually fixed parts.

The assembly 11 further comprises two support members 26, 27 of a known type (not described in detail), respectively fixed to the sides 12, 13 and defining respective fastening points, which are symmetrically arranged with respect to a vertical plane of the centre line of the motor vehicle 1 and are higher than the fastening points defined by the members 16, 17.

The upper end portions of the frames 8a, 9a support respective coupling elements 28, 29, which can be coupled to the members 26, 27 in a fixed position and in a releasable manner. The backrests 8,9 or the sides 12,13 support two control elements (not shown), for example two levers, which can be manually operated to release respectively the elements 28, 29 from the members 26, 27. After this release, the backrests 8, 9 can freely rotate about the axis 10 to be brought into their lowered position.

Figure 2:
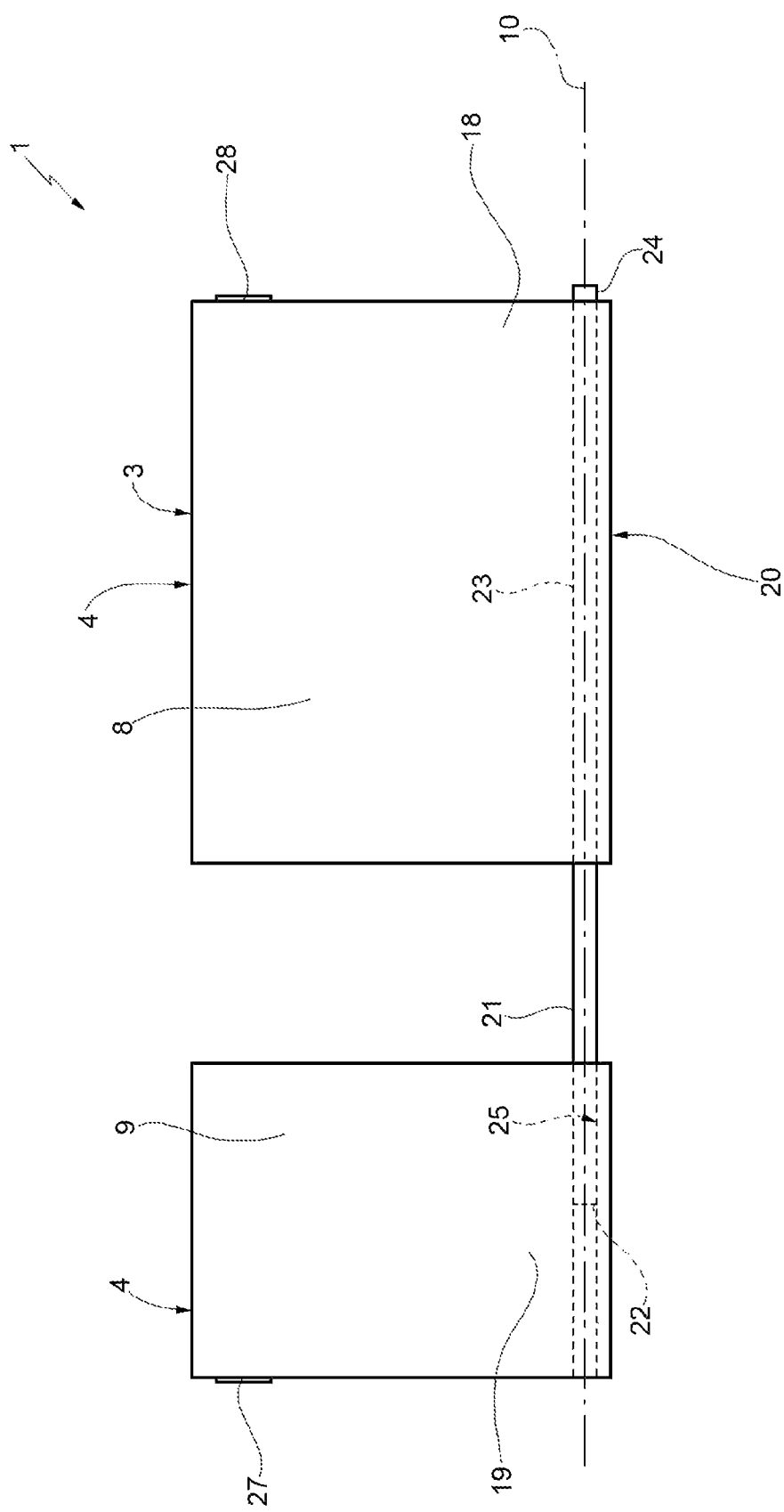
FIG. 2 is a schematic view similar to FIG. 1, showing the assembly of the rear seat of FIG. 1.

As shown in FIGS. 2 and 3, the seat 3 is assembled by axially inserting the segment 21 into the seat 25 until the fastening element 22 protrudes beyond the portion 19. The fastening elements 22 and 24 are finally coupled to the members 16, 17 in order to hinge the backrests 8, 9 to the body 2. Advantageously, the fastening elements 22, 24 are snappingly coupled to the members 17, 16 in a not releasable way.

According to the embodiment of FIG. 5, the fastening elements 22,24 are replaced by fastening elements 22a, 24a that are simply hinged to respective support brackets 16a, 17a, which are then fixed to the side panels 12 and, respectively, 13 or to a floor of the motor vehicle. Preferably, the fastening elements 22, 24 and/or the members 16, 17 are provided with systems (not shown) for recovering play and/or machining and assembling tolerances. Preferably, the seat portions of the two units 4 are defined by elements separated from the backrests 8, 9 and are coupled to the body 2 by means of a system other than the assembly 11.

With reference to FIGS. 3 and 4, the segment 21 is coupled to the portion 19 through two pairs of bushings 30a, 30b, made of a plastic material. Each pair 30a, 30b is constituted by an inner bushing 31a, 31b, fitted on the segment 21 in an angularly fixed position; and by an outer bushing 32a, 32b, which is coupled to the frame 9a in an angularly fixed position and is fitted on the corresponding inner bushing 31a, 31b in an angularly rotatable position. In particular, the outer bushings 32a, 32b are respectively coupled to the lower ends of the lateral uprights 25c, 25d, as it will be better explained in the following.

As shown in FIG. 4, the segment 21 is externally defined by a side surface 35 which is not cylindrical, but has at least one face 36 tangential with respect to the axis 10. In particular, the outer cross section of the surface 35 is polygonal, for example squared. Correspondingly, the inner bushings 31a, 31b have an inner profile which is complementary to the one of the surface 35, namely have respective inner surfaces 38a, 38b radially facing and resting on the face 36 to angularly fasten the inner bushing 31a, 31b with respect to the segment 21.

The inner bushings 31a and 31b are arranged on opposite sides of the frame 9a: the inner bushing 31a is arranged at the upright 25c, is fitted on the segment 21 in an axially slidable position and comprises an end portion 39 arranged in axial abutment against the frame 8a, on the one hand, and against the corresponding outer bushing 32a, on the other hand; the inner bushing 31b is, however, arranged in correspondence of the upright 25d and is axially arranged side by side with the fastening element 22.

Preferably, the inner bushing 31b comprises one or more teeth 40 which are elastically deformable and/or flexible, radially protruding inwards and snappingly coupled to corresponding stopping seats 41 formed in the axial end of the segment 21; and one or more teeth (visible in the enlargement of the bushing 31b in FIG. 3), which are elastically deformable and/or flexible, radially protrude outwards, are angularly alternated to teeth 40 and are snappingly coupled to the outer bushings 32b to keep them in a relatively fixed axial position.

The outer bushings 32a, 32b comprise respective teeth 43a, 43b, elastically deformable and/or flexible, radially protruding outwards and snappingly coupled to the lower ends of the uprights 25c, 25d to keep the outer bushings 32a, 32b in an axially fixed position with respect to the portion 19. In particular, the teeth, 43a and 43b are arranged along the entire circumference of the outer bushings 32a, 32b.

From the above it is clear how the proposed solution allows to have only four fastening points to engage the backrests 8, 9 thus avoiding the use of the intermediate bracket that is present in the known solutions and which is adapted to support the shaft 20 in an intermediate position between the portions 18, 19.

By appropriately designing the shaft 20 and the coupling areas between the fastening elements 22, 24 and the members 16, 17, it is possible to obtain a seat 3 with the same safety degree of the known solutions in which the backrest is provided with five fastening points.

In this way, the members 16, 17 can become "universal" supports, to which seats of any width can be coupled, regardless of the shape and of the structural characteristics of the floor of the motor vehicle 1.

From the above it is also clear that the assembling of the seat 3 and its mounting on the motor vehicle 1 are extremely simple and fast and do not require any special equipment.

Furthermore, the fact that the segments 21 and 23 define a continuous piece between the sides 12, 13 allows to obtain a high stiffness.

Moreover, the pairs of bushings 30a, 30b help to decouple the rotation movements of the backrests 8, 9, thus reducing friction.

From the above it is finally clear that the described and illustrated seat 3 can be subject to modifications and variations which do not depart from the field of protection of the present invention as defined in the appended claims. In particular, the seat portions of the two units 4 can also be provided with a movement with regard to the body 2 for further compacting the seat 3 when the backrests 8, 9 are reclined.

The invention claimed is:

1. A split rear backrest for a motor vehicle, said split rear backrest being adapted to be arranged between two side panels of the vehicle and comprising:
  a first and a second backrest, which respectively comprise
    a first and a second lower portion, arranged side by side along a horizontal axis, and are independently rotatable about said horizontal axis;

a shaft, extending along said horizontal axis and comprising:
 a) two axially opposite ends, defining respective fastening elements which are adapted to be respectively coupled to said side panels, in a rotating manner about said horizontal axis;
 b) a first segment arranged within said first lower portion and fixed with respect to said first lower portion;
 c) a second segment, fixed with respect to said first segment, axially protruding from said first lower portion and rotationally engaging an axial seat formed in said second lower portion;
two coupling elements respectively carried by said first and second backrests and adapted to be releasably fixed to said side panels;
two pairs of bushings coupling said second segment to said second lower portion; each of said pairs of bushings being constituted by:
 an inner bushing, fitted on said second segment in an angularly fixed position; and
 an outer bushing, coupled to said second lower portion in an angularly fixed position and fitted on the corresponding inner bushing in a rotatable position, wherein said fastening elements and said coupling elements define the only four fastening points to engage said backrests in said motor vehicle.

2. A split rear backrest according to claim 1, wherein said second segment is delimited by an outer side surface having at least one face tangential with respect to said horizontal axis; said inner bushings having respective inner surfaces, which are complementary and coupled to said tangential face so as to angularly lock said inner bushings with respect to said second segment.

3. A split rear backrest according to claim 1, wherein said inner bushings are defined respectively by:
 a first inner bushing comprising an end portion arranged in axial abutment against said first lower portion, on the one hand, and against the corresponding outer bushing on the other end; and
 a second inner bushing arranged near to a said end.

4. A split rear backrest according to claim 3, wherein said second inner bushing comprises at least one flexible tooth snappingly coupled to a corresponding stopping seat formed in said second segment.

5. A split rear backrest according to claim 3, wherein said first inner bushing is fitted on said second segment in an axially slidable position.

6. A split rear backrest according to claim 1, wherein said outer bushings comprise respective flexible appendices snappingly coupled to said second lower portion in fixed axial positions.

7. A motor vehicle comprising a split rear backrest made according to claim 1.

8. A motor vehicle according to claim 7, wherein said horizontal axis is fixed.

9. A split rear backrest according to claim 1, wherein said first and second segments are made in one piece.

\* \* \* \* \*